United States Patent [19]

Söderholm

[11] 4,225,002
[45] Sep. 30, 1980

[54] WEIGH-BRIDGE RESTING ON LOAD MEASURING POINTS

[75] Inventor: Arne O. Söderholm, Bromma, Sweden

[73] Assignee: S.E.G. Resistor AB, Vallingby, Sweden

[21] Appl. No.: 964,067

[22] Filed: Nov. 17, 1978

[51] Int. Cl.³ .......................................... G01G 21/12
[52] U.S. Cl. ................................................ 177/255
[58] Field of Search ........................................ 177/255

[56] References Cited

U.S. PATENT DOCUMENTS

| | | | |
|---|---|---|---|
| 2,835,484 | 5/1958 | Bradley | 177/255 X |
| 3,002,576 | 10/1961 | Kuhnle | 177/255 |
| 3,999,621 | 12/1976 | Wagner | 177/255 X |
| 4,015,678 | 4/1977 | Wirth et al. | 177/255 X |
| 4,134,467 | 1/1979 | Czyryk | 177/255 X |

Primary Examiner—George H. Miller, Jr.
Attorney, Agent, or Firm—Cushman, Darby & Cushman

[57] ABSTRACT

The invention deals with a weigh-bridge of platform type resting on load measuring points also serving as support points for the load. The weigh-bridge of the invention eliminates the effect of disturbing lateral load forces and torques. The weigh-bridge is composed of at least two parts being mutually joined by means of flexurally weak elements in the direction of the load. The load receiving support points are located at the ends of adjacent sides of platform parts. The flexurally weak elements are arranged to transfer the load between two adjacent platform parts. All support points are located for supporting each platform part by three points of support.

4 Claims, 9 Drawing Figures

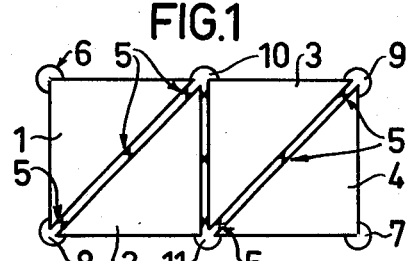
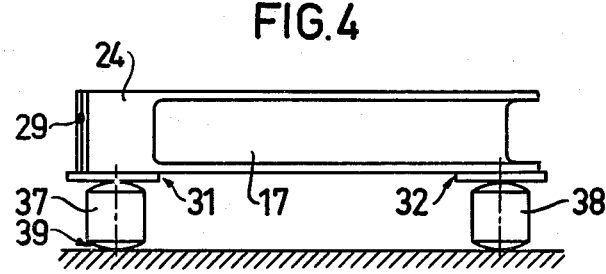
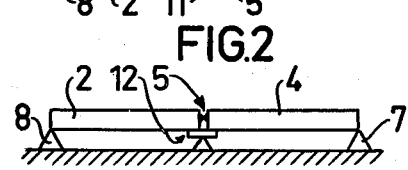
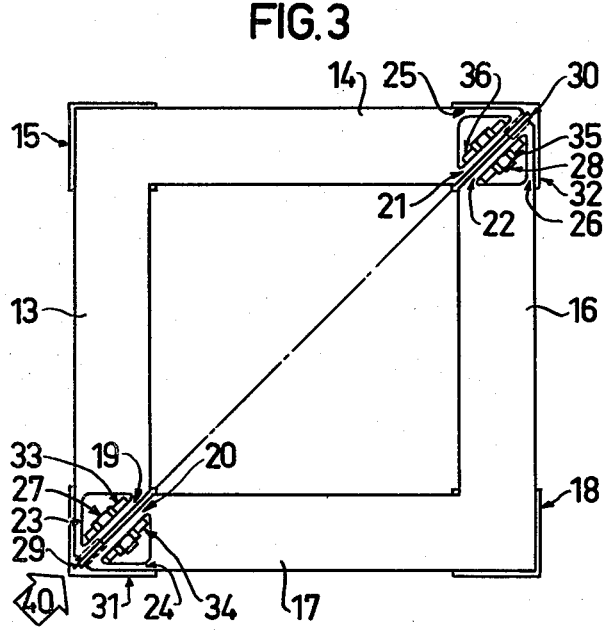
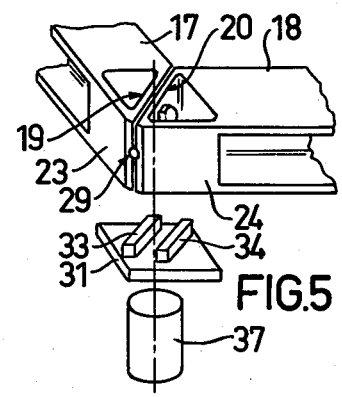
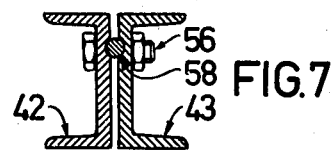
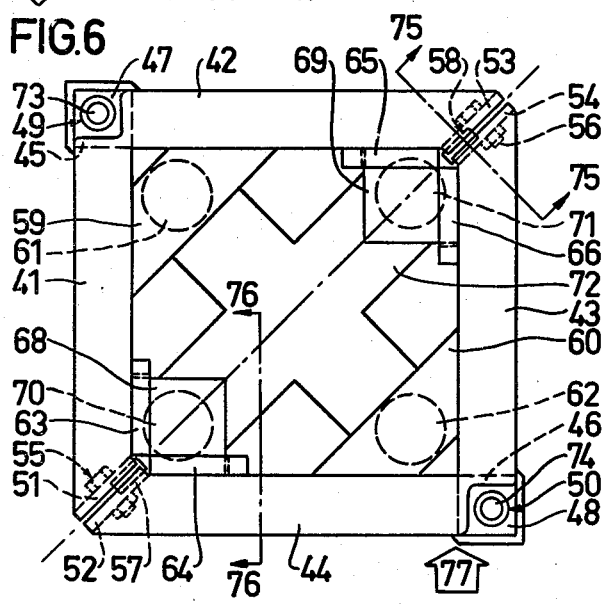
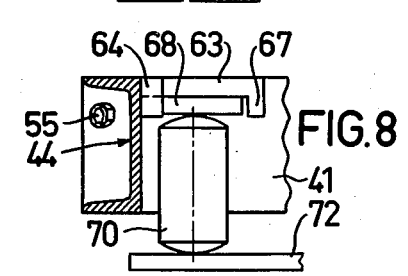
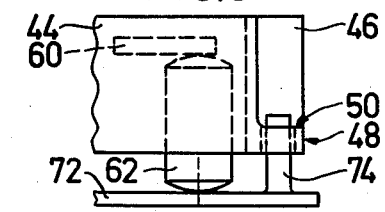

WEIGH-BRIDGE RESTING ON LOAD MEASURING POINTS

When weighing objects on a load carrier being of platform-type, the platform usually has a rectangular form and a load receiving point in each corner. In weighing machines the individual loads in the load receiving points are combined by way of several lever arms to an unsymmetrical lever the load of which is balanced against a weight, being a measure of the load constituting the object. In so-called hybrid weighing machines the stepped-down load is measured by means of an electrical sensor—in the following called a load transducer.

In so-called electromechanical weighing machines a load transmitter is usually placed immediately below each corner of the platform in order to measure and transmit the load in each load receiving point. This will render it possible to use a simple mechanical structure for the weigh-bridge, i.e. a steel girder structure or a concrete slab. As the platform has a load receiving point in each corner, and may have further such points arranged along its sides, the structure will not be statically defined. In order to have the total load optimally distributed between the load transducers, it is required that the platform is sufficiently torsionally weak along its horizontal axes. If the supports of the load transducers are situated on different levels and if those supports are not stable, the platform must have such an elasticity in torsional direction that is hard to combine with sufficient stiffness in the direction of the line of action of the load.

The present invention relates to a load carrier of platform-type in an electromechanical weithing machine having more than three points of support. Said load carrier is composed of several parts, and said parts are flexurally weakly joined, and load receiving points of support are arranged close to the ends of each flexurally weakly joined pair of sides, thereby giving each part of the platform three points of support. In this way the mounting of each platform part will be statically defined, and the whole platform will be substantially independent of the stability and the levelness of the supports. It is also a characterizing feature of the invention that the joined sides of the load carrier are only allowed to wind relative to each other, the joints, however, being made stiff in respect of transversal loads, i.e. the load of the object will be transferred from one part of the platform to the other via the joint.

The parts of the platform may either be made of steel girder strutures, in which case the load transducers receiving the load from the platform may be placed in a frame structure close to the corners of the parts of the platform, or said parts may, for instance, be made of massive concrete blocks, in which case the load tranducers are placed below the platform and below the corners and the ends of the joints.

The load transducers of the points of support are always exposed to disturbing lateral loads and torques when deformation occurs by the load of the object, or when its dimensions are changed due to changes in temperature. Commonly known means and methods for avoiding such effects can be taken into account when designing the points of support.

The torsionally weak joints of the sides of the parts of the platform can be made in several known ways, making the joining be of hinge-type.

On the enclosed drawing FIGS. 1 and 2 show the general arrangement of the platform according to the invention.

FIGS. 3, 4 and 5 show an embodiment where the load transducers are placed below the platform frame, and FIGS. 6, 7, 8 and 9 show embodiment where the load transducers are placed inside the corners of the frame.

In FIG. 1 a rectangular platform structure is illustrated from above. The covering sheet on the upper side of the platform, and intended to carry the load, is not shown. The platform consists of four triangular parts 1 through 4. The parts 1 and 2 comprise three torsionally weak but laterally stiff joint elements 5 between their adequately distantly related sides. Said joint elements might be of the type illustrated in FIG. 7. The assembled platform rests on six load receiving points consisting of load transducers. Load transducers 6 and 7 carry each a rigid outer corner. Load transducer 8 carries the load acting in this corner from the platform parts 1 and 2. Similarily, load transducer 9 carries the load from the platform parts 3 and 4. Load transducer 10 carries the load from the parts 1, 2 and 3 of the platform. This is made possible due to the joint elements 5 transmitting lateral forces from the different corners to that platform corner below which the combined load from said three parts is transferred to the load transducer. In the same way load transducer 11 carries the load from the three adjacent corners of the platform parts 2, 3 and 4.

In FIG. 2 the diagrammatically shown platform in FIG. 1 is illustrated in a lateral view seen from the bottom long side in FIG. 1. The parts 2 and 4 of the platform are joined together by means of the flexurally weak element 5 and the symbolically shown load transmitters 7, 8 and 11. The load transmitter 11 is provided with a spacer plate 12 combining the loads from the corners of the parts of the platform to the top side of said load transmitter. The platform shown in FIGS. 1 and 2 may be divided into an arbitrary number of parts which are joined together in the way illustrated.

FIG. 3 shows a top view of a platform composed of two triangular parts under which the load receiving load transducers are placed. The platform is shown without any covering sheet on which the object to be weighed is placed. One part of the platform consists of two girders 13 and 14 being rigidly joined at right angle. Below the corner thus formed a plate 15 is located. The other part of the platform consists of the girders 16 and 17 having a spacer plate 18 in the corner. The two frame ends of each platform part are mutually joined by means of torsionally weak elements. Said elements consist of vertically located end plates 19 through 22 each one being aligned in parallel to the diagonal line of the platform and being supported by vertical plates 23 through 26 attached to the ends of the frame girders 13 through 17. The end plates 19 through 22 are pressed against each other by means of boltings 27 and 28 but are adequately distantly related by means of pins 29 and 30 along the diagonal line of the platform, said pins being inserted in holes in the contact planes between pairs of end plates 19, 20 and 21, 22. The location of them is also readily apparent from FIG. 5, as will be further described below. A further plate 31 and 32, respecively, each one having two cams 33, 34 and 35, 36, respecively, and transferring the combined corner load to a load transducer, is located under each pair of vertical plates 19, 20 and 21, 22, respectively.

FIG. 4 shows a side view of the platform in FIG. 3 seen from the bottom side thereof. FIG. 4 shows a frame girder 17 and its corner details and the load transducers 37 and 38 located under the frame. In order to avoid disturbing influences by lateral forces, said transducers are provided with spherical top side and bottom side 39 having such radii that the platform will always tend, in a manner known per se, to attain a stable position.

FIG. 5 is a so-called perspective exploded view representation of a corner between the girders 13 and 17 seen in the direction of the arrow 40 in FIG. 3. The girder end plates 19, 23 and 20, 24 respectively and the position defining pin 29 are clearly shown. The plate 31 with the cams 33 and 34 is shown some distance from the frame corner, and further below the load transducer 37 is diagrammatically shown.

One object of the pins 29 and 30, respectively, is to maintain the parts of the platform at a desired distance in relation to each other, and another object is to constitute a defined pivot axle around which the two platform parts can turn, simultaneously allowing vertical loads to be transferred from one platform part to the other. During manufacture, the two plates 19 and 20 are preferably kept at the required distance from each other by means of a spacer plate, the bolt 27 being tightened. In this position the hole for the pin 29 is bored, with half the hole in each one of the plates 19 and 20. After that the spacer plate is removed and the pin 29 is pressed into the hole, and the bolt 27 is further tightened. If necessary, similar holes may be bored from the inside of the corner towards the said outer pin, in order to reinforce the lateral force transferring strength of the joint.

FIG. 6 shows a platform seen from the top side comprising two triangular parts in the inner corners of which the load transmitters are located. This embodiment of the invention allows the height of the platform to be made as small as possible, as is often essential for the practical use of the weighing machine. Moreover, the platform is provided with stop elements for limiting horizontal movements due to lateral forces to an allowable value. Even this platform is shown without a covering sheet on which the object to be weighed can be placed. One frame part consists of the girders 41 and 42, the other frame part of the girders 43 and 44. Each frame part is rigidly joined by means of angle irons 45 and 46 respectively. Both said angle irons are stiffened by means of plates 47 and 48, respectively, each one being provided with a hole 49 and 50, respectively. The free girder ends of the two frame parts are mutually joined by means of flexurally weak elements. For that reason each girder end is terminated by an end plate 51, 52 and 53, 54, respectively, each one being parallel to one diagonal line of the platform, due to the cutting of each frame end at an angle of 45°. Said end plates are pressed together by means of boltings 55 and 56, respectively, but are kept at the required distance from each other by means of pins 57 and 58, respectively, along said diagonal line of the platform by being inserted in holes bored in the end plates. The location of said pins is also illustrated in FIG. 7, as will be described below. In the rigid corners of the frame parts, shelves 59 and 60, respectively, are inserted, forming supports for the load transducers 61 and 62, respectively. The load transducers are of the same type as the previously described load transducers 37 and 38. In the torsionally weak corners of the frame parts rigidly attached rods 63, 64 and 65, 66, respectively, are located along the girder, and are provided with a shoulder at the end facing the opposite frame corner, said shoulder protruding at a right angle. This is apparent from FIG. 8, illustrating a rod 63 and its shoulder 67. FIG. 8 will be further described below. Under the rods 63 through 66 plates 68 and 69, respectively, forming the upper support surface for the load transducers 70 and 71, respectively, are so located that the shoulders (67 in FIG. 8) will lock their movement in a plane parallel to the platform. Due to the plates 68 and 69 being loose and only supported by the rods 63 through 66, angular movements in the torsionally weak joints of the corners will not be prevented, but vertical load forces being transferred from the frame girders to the load transducers. The load transducers 61, 62 and 70, 71 have their bottom surfaces resting against a cruciform support bed 72. Said bed extends underneath the rigid frame corners, thus forming supports for the stop elements 73 and 74, respectively. The design of these stop elements is apparent from FIG. 9, as will be described below.

FIG. 7 shows a cross section along the line 75—75 through the flexurally weak joint between the frame part ends 42 and 43, and also shows the position of the bolt 56 and the pin 58. The level of the bolt and the pin is preferably the same as that for the plates 68 and 69.

FIG. 8 shows a cross section along the line 76—76 through the frame girder 44 seen towards the other flexurally weak joint. The location of the load transducer 70 between the support bed 72 and the plate 68 is also apparent. In addition, this FIG. 8 shows the rod 63 and its shoulder 67 guiding the plate 68, and also shows the cross section of the rod 64.

FIG. 9 is a view seen along the arrow 77 in FIG. 6 in part, illustrating the stop element for limiting the horizontal movement. The elements 46 and 48 of the rigid frame corner and the hole 50 in the plate 48 are illustrated. The stop element 74 extending upwards through the hole 50 has a sufficiently smaller diameter for allowing a desired horizontal movement when horizontal forces actuate the platform. The stop element is rigidly attached to the support bed 72 on which the load transmitter 62 is also resting. By attaching the support bed 72 to the base plate for the weighing machine, the platform can be exposed to horizontal load forces, thus being transferred via the sides of the holes 49 and 50, respectively, by the stop element 74 and 75, respectively, to the cruciform support bed 72 attached to the base plate.

The embodiments illustrated only refer to one type of joints. The same function, i.e. flexurally weak joints, may be achieved in other ways. Likewise, statically defined arrangements for platforms of other form, such as circular ones, may be achieved according to the invention. For circular platforms the two parts of the platform may have semi-circular form.

The weighing machine of the invention is intended to be of electromechanical type, but is also applicable to hydraulic or pneumatic load transmitters or to load transducers operating according to other principles, having an outer appearance of a body capable of receiving and transferring the load in a support point.

What I claim is:

1. Weigh-bridge of horizontal platform type for an electromechanical, hydraulic or pneumatic weighing machine having more than three points of support, characterized in that the platform is composed of at least two parts in a common plane being mutually joined in a symmetrical way by means of flexurally weak but laterally stiff joint elements so that the platform is torsionally weak along its horizontal axes and so that the load of an object on the platform will be transferred from one part of the platform to an adjacent part via the joint elements, that load receiving support points comprised of load transducers, are located at the ends of adjacent sides of platform parts, and that all said support points are so located that each platform part is supported by three points of support.

2. Weigh-bridge according to claim 1, characterized in that load receiving support points in the form of load transducers are located at the ends of adjacent sides of platform parts and are located below said platform parts.

3. Weigh-bridge according to claim 1, characterized in that load receiving support points in the form of load transducers are located at the ends of adjacent sides of platform parts, and are located within said platform parts.

4. Weigh-bridge according to anyone of the claims 1 to 3, characterized in that movement limiting elements for lateral movements of the platform are located close to those points of support supporting rigid platform parts.

* * * * *